United States Patent
Hibino et al.

(10) Patent No.: US 7,956,312 B2
(45) Date of Patent: Jun. 7, 2011

(54) OPTICAL DISC DEVICE

(75) Inventors: Kiyoshi Hibino, Gifu (JP); Kenichirou Kawabuchi, Kanagawa (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 867 days.

(21) Appl. No.: 11/871,819

(22) Filed: Oct. 12, 2007

(65) Prior Publication Data
US 2008/0095018 A1    Apr. 24, 2008

(30) Foreign Application Priority Data

Oct. 13, 2006    (JP) .................... 2006-279709

(51) Int. Cl.
*G11B 7/00* (2006.01)
(52) U.S. Cl. ............... 250/201.5; 250/201.2; 250/201.4; 347/242; 347/257
(58) Field of Classification Search .................. 700/302; 347/258, 224, 242, 256, 257; 250/201.2, 250/201.4, 201.5
See application file for complete search history.

(56) References Cited

U.S. PATENT DOCUMENTS

| | | | | |
|---|---|---|---|---|
| 6,660,986 | B2 * | 12/2003 | Matsumoto et al. | 250/201.5 |
| 7,435,934 | B2 * | 10/2008 | Park et al. | 250/201.5 |
| 2006/0018214 | A1 * | 1/2006 | Fujii et al. | 369/44.37 |
| 2007/0279480 | A1 * | 12/2007 | Asano | 347/233 |

FOREIGN PATENT DOCUMENTS

| | | |
|---|---|---|
| JP | 9-212905 | 8/1997 |
| JP | 2001-344803 | 12/2001 |
| JP | 2005-093052 | 4/2005 |
| JP | 2005-216468 | 8/2005 |

* cited by examiner

*Primary Examiner* — Adam R Giesy
(74) *Attorney, Agent, or Firm* — Fish & Richardson P.C.

(57) ABSTRACT

An optical disc device comprising: first and second laser diodes to radiate first and second laser beams with different first and second wavelengths, respectively; a first objective lens to irradiate the first laser beam to reflection area to read out image recording control data for controlling record of image recorded in the reflection area on label side of optical disc; a second objective lens to irradiate the second laser beam to image recording area to record image in the image recording area on the label side after reading out the data; a lens holder that the lenses are fixed thereon to be arranged side by side in radial direction, to be displaced in direction toward signal side and the radial direction; and a control unit to obtain distance between the lenses in the radial direction to calibrate recording position of image signal recorded in the image recording area.

16 Claims, 4 Drawing Sheets

OPTICAL DISC DEVICE

CROSS-REFERENCE TO RELATED APPLICATION

This application claims the benefit of priority to Japanese Patent Application No. 2006-279709, filed Oct. 13, 2006, of which full contents are incorporated herein by reference.

BACKGROUND OF THE INVENTION

1. Field of the Invention

The present invention relates to an optical disc device configured to be able to visually record images: by using an optical disc in which an image recording layer is provided on a label side, which is a back face of a signal side irradiated with laser beam for reading out signals recorded in a signal recording layer; and by irradiating the laser beam to the image recording layer.

2. Description of the Related Art

Optical disc devices capable of a signal reading operation and a signal recording operation by irradiating laser beam radiated from an optical pickup device to a signal recording layer of an optical disc is widely used.

For example, in the optical disc devices using optical discs called as CD and DVD, there is a type that is configured to be able not only to read out a recorded data signal but also to record a data signal in the optical disc.

When these optical discs recorded as above are to be put in order, contents of the recorded data are noted in marker pens or the like on label sides of the optical discs such that the contents of the data signal personally recorded in the optical discs can be known. However, with such a method, the note is hand-written, which is not good in appearance, and since it requires writing instruments, it is very inconvenient. Alternatively, such a method is employed that an image is printed on a label side by a printer, but it requires a special kind of printers, which is not practical.

As a method to solve those problems, such an art has been developed recently that an image recording layer is provided on a label side, which is a back face of an optical disc, and that an image is recorded as visible information by irradiating laser beam to the image recording layer. In this art, with a signal recorded in the signal recording layer being ready to be reproduced, the optical disc is loaded on a turntable upside down and image data desired by a user is inputted and processed, while a driving signal supplied to a laser diode by an action of an image forming driving circuit is changed and a spot position of the laser beam is controlled such that the image is recorded in the image recording layer provided on the label side (See Japanese Patent Laid-Open No. 2005-93052 and Japanese Patent Laid-Open No. 2005-216468).

The art described in Japanese Patent Laid-Open No. 2005-93052 is configured that a gain of a driving device when an objective lens is driven and displaced in the radial direction of the optical disc based on a reference pattern arranged on the innermost circumferential position of the optical disc, that is, a driving displacement amount to the driving signal value is obtained, and by controlling the displacing operation of the objective lens in the radial direction of the optical disc based on the obtained gain, a spot position of the laser beam for recording an image in the image recording layer provided on the optical disc is controlled.

The reference pattern is a serrated state inclined linearly in the radial direction of the optical disc, for example. An operation to obtain the above gain is achieved by moving the spot of the laser beam to a position forming the reference pattern while the optical disc is rotated with a constant angular speed. From a duty ratio of a reflectance ratio detected when the spot scans the reference pattern, a spot position (radial position) in the radial direction is recognized. Several of the radius positions are sampled while the spot position is displaced in the radial direction of the optical disc within a range of the reference pattern, and sampled radius positions and a value of the driving signal supplied to a tracking coil displacing the objective lens in the radial direction at that time are stored in memory means as table data any time. And with the radius position of each sample and the driving signal value stored in the memory means as a coordinate value, a straight line most matching all the coordinate values, that is, a relation between the driving signal value and the driving displacement amount is obtained. The inclination of this straight line is obtained and set as a gain of the tracking coil for displacing the objective lens when the spot of the laser beam is driven and displaced in the radial direction of the optical disc.

Recently, in addition to the above-mentioned optical discs called as CD and DVD, an optical disc using a blue laser beam with a wavelength of approximately 400 nm as recording/reproducing laser beam (hereinafter referred to as a next-generation DVD) is standardized, and commercialization is being promoted. When the next-generation DVD is put into commercial use, optical disc devices which can use all the optical discs including the existing CD and DVD and the next-generation DVD are expected to be commercialized.

In this case, an optical pickup device capable of recording and reproducing operations of a signal from all the optical discs will be needed. In such an optical pickup device, there can be a method of incorporating two lenses of an objective lens for the CD and DVD and an objective lens for the next-generation DVD in the optical pickup device (See Japanese Patent Laid-Open No. 9-212905 and Japanese Patent Laid-Open No. 2001-344803).

With the optical pickup device in which two objective lenses are incorporated, the objective lenses can be arranged side by side in a direction crossing the radial direction of the optical disc, but in this case, if the two objective lenses are arranged such that one of them is moved on the same radius of the optical disc, the other objective lens will be moved along the radius of the optical disc at a position separated from that radius by a given distance. In this case, a direction of a signal track projected onto a photodetector via the objective lens deviated from the radius of the optical disc is deviated as this objective lens is moved toward the outer circumference side from the inner circumference side of the optical disc. As a result, there is a problem in the optical pickup device with this configuration that the signal recording and reproducing operations with high accuracy is not possible.

As a method to solve the above problem, there is a method of arranging two objective lenses side by side in the radial direction of the optical disc. In an optical pickup device with this configuration, when an objective lens arranged outside in the two objective lenses is moved to the innermost circumferential position of the optical disc, the objective lens arranged on the inner circumference side is moved to the further inner circumference side than that position. If the two objective lenses are arranged side by side in the radial direction of the optical disc as above, a clearance between the objective lens arranged on the inner circumference side of the optical disc and the turntable on which the optical disc is mounted becomes a problem. Such a problem can be solved by reducing the size of the two lenses or by devising the shape of a lens holder.

With an optical disc called as a blue-ray disc, for which commercialization is being promoted as one of the next-generation DVD, the innermost circumferential position of a data region is shifted to the inner circumference side as compared with the other optical discs. Therefore, in order to cope with the clearance problem from the turntable on which the optical disc is mounted, it is more advantageous that the objective lens for the blue-ray disc is arranged on the inner circumference side of the optical disc.

In an optical disc device including an optical pickup device in which: the objective lens for the blue-ray disc, that is, the objective lens for the next-generation DVD is arranged on the inner circumference side of the optical disc; and the objective lens for CD and DVD is arranged on the outer circumference side, when an image is recorded on the label side of the optical disc, the image recording layer is arranged on the surface of the label side for all the optical discs.

Therefore, the recording operation of an image signal to the label side can be carried out by laser beam irradiated from the objective lens for CD and DVD even for the optical disc of the next-generation DVD standard. And in this case, it may be so configured that the laser beam from the objective lens for the next-generation DVD arranged on the inner circumference side is irradiated the reference pattern provided on the inner circumference side of the optical disc so as to carry out the reading operation of data for image recording and control.

In the case of the above operation, if a distance between the objective lens for the next-generation DVD arranged on the inner circumference side and the objective lens for CD and DVD arranged on the outer circumference side is not accurate, the image recording operation with accuracy is not possible. In the optical pickup device, the objective lens for the next-generation DVD and the objective lens for CD and DVD are securely mounted to a lens holder, but the distance can not be as being set due to a mounting error.

SUMMARY OF THE INVENTION

An optical disc device according to an aspect of the present invention, comprises: a first laser diode configured to radiate a first laser beam with a first wavelength; a second laser diode configured to radiate a second laser beam with a second wavelength different from the first wavelength; a first objective lens configured to irradiate the first laser beam to a reflection area so as to read out image recording control data for controlling record of an image recorded in the reflection area provided on a label side of an optical disc; a second objective lens configured to irradiate the second laser beam to an image recording area so as to record an image in the image recording area provided on the label side after reading out the image recording control data; a lens holder configured such that the first objective lens and the second objective lens are fixed thereon to be arranged side by side in a radial direction of the optical disc, the lens holder configured to be displaced in a direction toward a signal side of the optical disc and in a radial direction of the optical disc; and a control unit configured to obtain a distance between the first objective lens and the second objective lens in the radial direction so as to calibrate a recording position of an image signal recorded in the image recording area.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
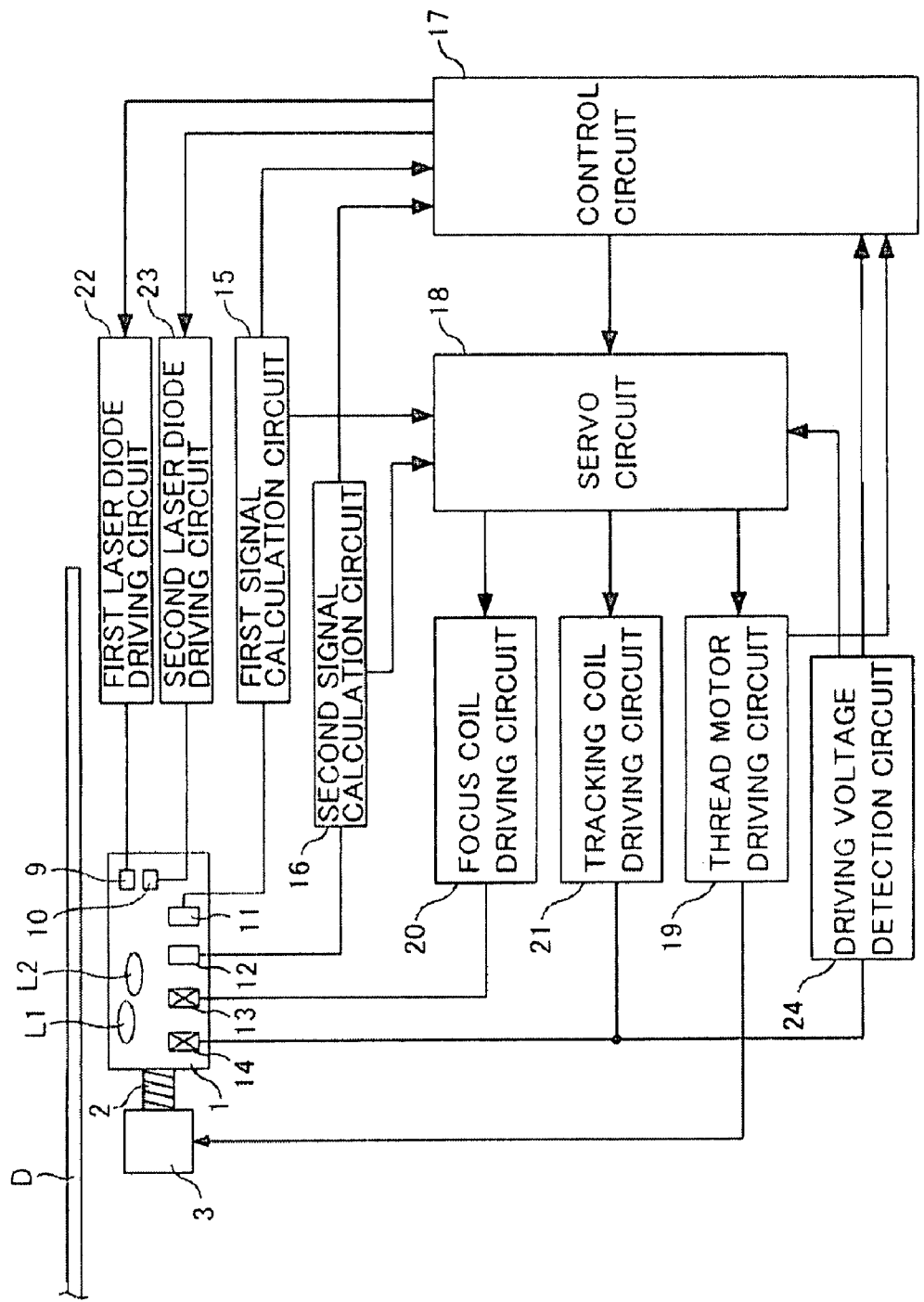
FIG. 1 is a diagram for explaining an operation of an optical disc device in which an optical pickup device according to an embodiment of the present invention is incorporated.
Figure 2A:
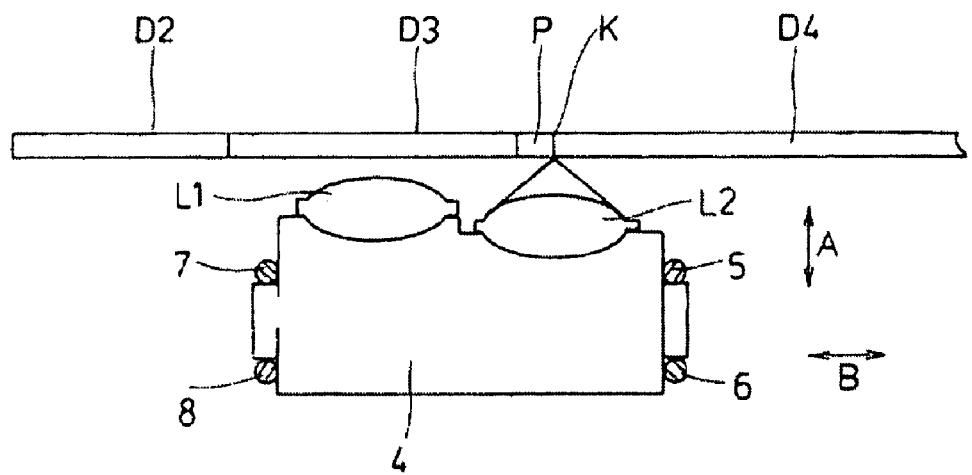
FIGS. 2A and 2B are views for explaining a relation between a lens holder and an optical disc according to an embodiment of the present invention.
Figure 2B:
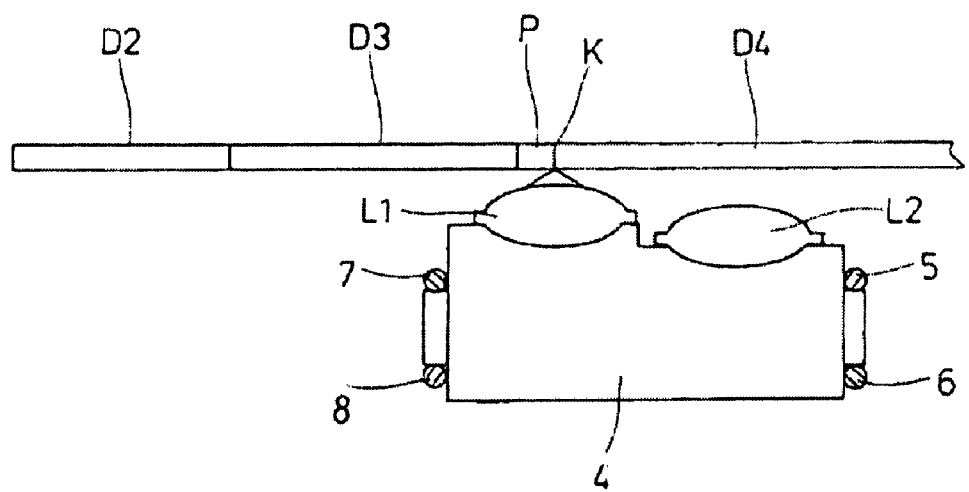
Figure 3:
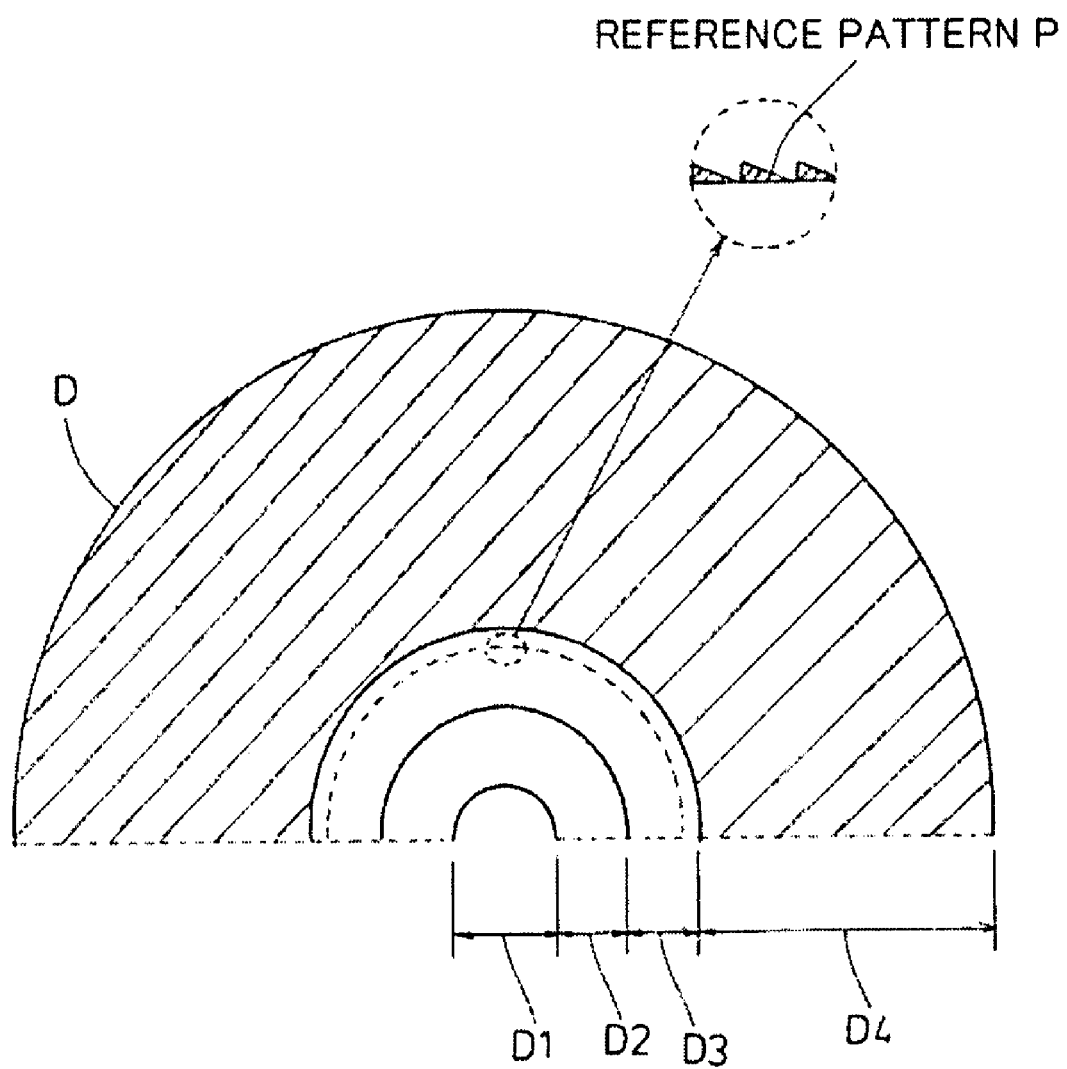
FIG. 3 is a view for explaining the optical disc according to an embodiment of the present invention.
Figure 4A:
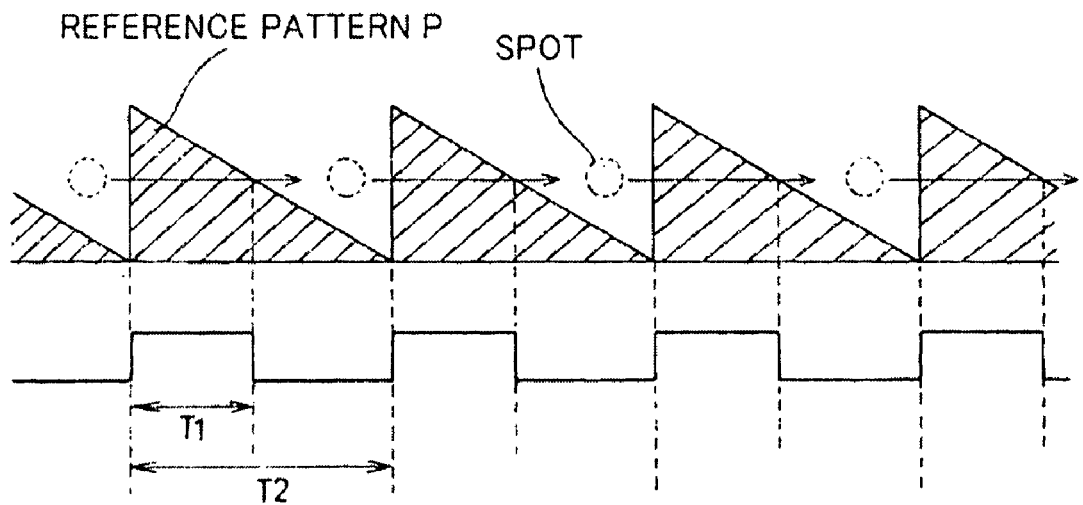
FIGS. 4A and 4B are diagrams for explaining an operation of an embodiment of the present invention.
Figure 4B:
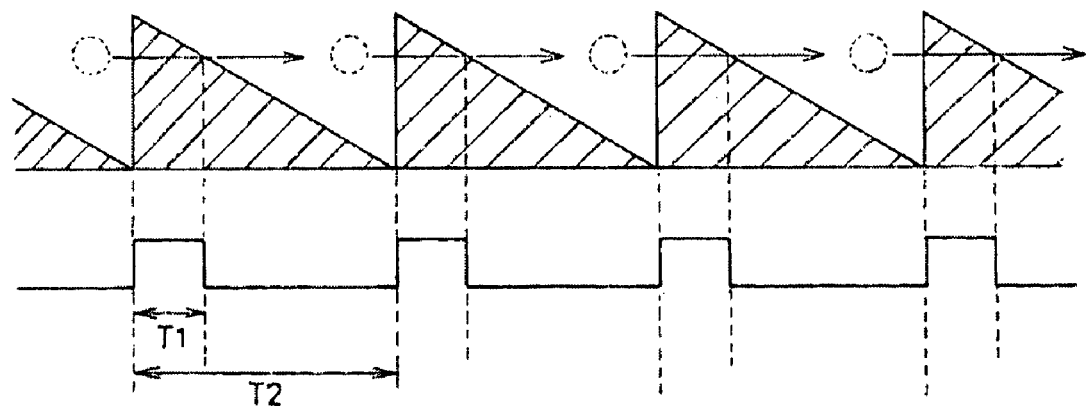

FIG. 1 is a diagram for explaining an operation of an optical disc device in which an optical pickup device according to an embodiment of the present invention is incorporated; FIGS. 2A and 2B are views for explaining a relation between a lens holder and an optical disc according to an embodiment of the present invention; FIG. 3 is a view for explaining the optical disc according to an embodiment of the present invention; and FIGS. 4A and 4B are diagrams for explaining an operation of an embodiment of the present invention.

An optical disc D used in an embodiment of the present invention will be described using FIG. 3. FIG. 3 shows the optical disc D seen from a label side, and a clamp area D2 mounted on a turntable is provided on the outer circumference side of a center hole D1. On the outer circumference side of the clamp area D2, a reflection area D3 is provided, and on the reflection area D3, a serrated-state reference pattern P, a part of which appears to be expanded, is formed. The reference pattern P is provided on the label side as data for image recording control, and as mentioned above, it is used when a gain of a tracking coil is set. And on the outer circumference side of the reflection area D3, an image recording area D4 is provided in which an image recording layer made of a material with a nature of discoloring when a temperature is raised by irradiation of a laser beam.

In FIG. 1, reference numeral 1 denotes a main body of an optical pickup device, reference numeral 2 denotes a shaft for feeding an optical pickup provided with a feeding groove formed on a peripheral edge and rotated and driven by a thread motor 3, which is configured such that the main body 1 is displaced in the radial direction of the optical disc D by the rotation.

Reference symbol L1 is a first objective lens for focusing the laser beam for the signal recording and reproducing operations to a signal recording layer provided on a first optical disc with the next-generation DVD standard and is configured capable of reading data for image recording control from the reference pattern P provided on the reflection area D3 on the label side. Reference symbol L2 is a second objective lens for focusing the laser beam for the signal recording and reproducing operations to the signal recording layer provided on a second optical disc with the current CD or DVD standard and second laser beam so that the data for image recording control can be read out from the reference pattern P provided on the reflection area D3 on the label side and is configured to focus the laser beam for the recording operation of an image signal to the reference pattern P provided on the label side of the first optical disc with the next-generation DVD standard as well as the reference pattern P provided on the label side of the second optical disc with the CD and DVD standard and moreover to the image recording layer formed on the label side.

The first objective lens L1 and the second objective lens L2 are, as shown in FIGS. 2A and 2B, fixed to be arranged side by side in the radial direction of the optical disc D on a single lens holder 4. The lens holder 4 is supported by four support wires 5, 6, 7, 8 with one ends fixed to a base (not shown) constituting the optical pickup device main body 3, capable of a displacement operation in a direction of a signal side of the optical disc D, that is, the displacement operation in an arrow A direction and the radial direction of the optical disc D, that is, the displacement operation in an arrow B direction.

Reference numeral 9 denotes a first laser diode radiating the first laser beam with a first wavelength and is configured so as to radiate the first laser beam according to a driving signal, the radiated first laser beam being, as known, made to enter the first objective lens L1 via a diffractive grating, a collimator lens, a polarizing beam-splitter, a rising mirror, a ¼ wavelength plate and the like and being irradiated to the signal recording layer or the reference pattern P of the first optical disc D as a spot by a focusing operation of the first objective lens L1.

Reference numeral 10 denotes a second laser diode radiating the second laser beam with a second wavelength different from the first wavelength and is configured so as to radiate the second laser beam according to a driving signal, the radiated second laser beam being, as known, made to enter the second objective lens L2 via the diffractive grating, the collimator lens, the polarizing beam-splitter, the rising mirror, the ¼ wavelength plate and the like and being irradiated to the signal recording layer, the reference pattern P or the image recording layer of the second optical disc D as a spot by the focusing operation of the second objective lens L2.

Description on the configuration of an optical system for guiding the first laser beam radiated from the first laser diode 9 to the first objective lens L1 and the configuration of an optical system for guiding the second laser beam radiated from the second laser diode 10 to the second objective lens L2 will be omitted since they can be constituted by using an optical system of a known configuration.

The first laser beam irradiated to the signal recording layer or the reference pattern P provided on the reflection area D3 on the label side of the first optical disc D by the focusing operation of the first objective lens L1 is reflected by the signal recording layer or the reflection area D3 and made to enter the first objective lens L1 as return light. The return light having entered the first objective lens L1 is made to enter the polarizing beam-splitter via the ¼ wavelength plate and the rising mirror and reflected by the polarizing beam-splitter as laser beam for first control. Reference numeral 11 is a first photodetector provided at a position where the laser beam for first control reflected by the polarizing beam-splitter is irradiated to and is called as PDIC in general. Since configuration of such an optical system is well-known, the description will be omitted.

Also, the second laser beam irradiated to the reference pattern P provided on the label side of the first optical disc D by the focusing operation of the second objective lens L2, the signal recording layer of the second optical disc D, the reference pattern P provided on the reflection area D3 on the label side, and the image recording layer is reflected by the label side, signal recording layer, reflection area D3 or the image recording layer and made to enter the second objective lens L2 as the return light. The return light having entered the second objective lens L2 is made to enter the polarizing beam-splitter via the ¼ wavelength plate and the rising mirror and is reflected by the polarizing beam-splitter as laser beam for second control. Reference numeral 12 is a second photodetector provided at a position where the laser beam for second control reflected by the polarizing beam-splitter is irradiated to and is called as PDIC in general. Since configuration of such an optical system is well-known, the description will be omitted.

Reference numeral 13 is a focus coil provided at the lens holder 4 to which the first objective lens L1 and the second objective lens L2 are fixed to be arranged in the radial direction and has an action to displace the lens holder 4 in an arrow A direction in cooperation with a magnet fixed to the base. Reference numeral 14 is a tracking coil provided at the lens holder 4 and has an action to displace the lens holder 4 in an arrow B direction in cooperation with the magnet fixed to the base.

Reference numeral 15 is a first signal calculation circuit in which an RF signal generation circuit for generating an RF signal, which is a signal obtained in response to the reading operation of a signal recorded in the signal recording layer of the optical disc D from a sensor incorporated in the first photodetector and receiving a main beam such as a quadrant sensor, a focus error signal generation circuit for generating a focus error signal, which is a signal obtained in response to the focusing operation of the laser beam from the quadrant sensor receiving the main beam, and a tracking error signal generation circuit for generating a tracking error signal, which is a signal obtained in response to the tracking operation of the laser beam from the sensor receiving a sub beam and is configured to generate a signal required for each operation.

Reference numeral 16 is a second signal calculation circuit in which an RF signal generation circuit for generating an RF signal, which is a signal obtained in response to the reading operation of a signal recorded in the signal recording layer of the optical disc D from a sensor incorporated in the second photodetector 12 and receiving a main beam such as a quadrant sensor, a focus error signal generation circuit for generating a focus error signal, which is a signal obtained in response to the focusing operation of the laser beam from the quadrant sensor receiving the main beam, and a tracking error signal generation circuit for generating a tracking error signal, which is a signal obtained in response to the tracking operation of the laser beam from the sensor receiving a sub beam and is configured to generate a signal required for each operation.

Reference numeral 17 denotes a control circuit for carrying out various control operations of the optical disc device, and reference numeral 18 denotes a servo circuit controlled by the control circuit 17 and controlling various control operations of the optical pickup device and a rotating operation of the thread motor 3 based on various signals obtained from the first signal calculation circuit 15 or the second signal calculation circuit 16. It is also configured to execute a rotating driving control operation of a spindle motor provided so as to rotate and drive the turntable on which the optical disc D is mounted, though not shown.

Reference numeral 19 denotes a thread motor driving circuit controlling the rotating operation of the thread motor 3 based on a control signal outputted from the servo circuit 18 and is configured to output pulse signals in the number according to the number of rotations of the thread motor 3 to the control circuit 17.

Reference numeral 20 denotes a focus coil driving circuit into which a focus control signal outputted from the servo circuit 18 is inputted based on the focus error signal generated and inputted by the focus error signal generation circuit incorporated in the first signal calculation circuit 15 or the focus error signal generation circuit incorporated in the second signal calculation circuit 16 and is configured to supply a driving signal to the focus coil 13. Reference numeral 21 denotes a tracking coil driving circuit into which a tracking control signal outputted from the servo circuit 18 is inputted based on a tracking error signal generated and inputted by the tracking error signal generation circuit incorporated in the first signal calculation circuit 15 or the tracking error signal generation circuit incorporated in the second signal calculation circuit 16 and is configured to supply a driving signal to the tracking coil 14.

Reference numeral 22 denotes a first laser diode driving circuit into which a signal for recording which is signal-processed at a signal processing circuit incorporated in the control circuit 17 is inputted and supplying a driving signal to the first laser diode 9 and is configured to supply to the first laser diode 9 a driving signal suitable for the recording operation in the signal recording layer provided on the first optical disc D, the reproducing operation for reproducing a signal recorded in the signal recording layer or reading out the reference pattern P provided on the label side.

Reference numeral 23 denotes a second laser diode driving circuit into which a signal for recording which is signal-processed at a signal processing circuit incorporated in the control circuit 17 is inputted and supplying a driving signal to the second laser diode 10 and is configured to supply a driving signal suitable for the recording operation in the signal recording layer provided on the second optical disc D, the reproducing operation for reproducing a signal recorded in the signal recording layer or reading out the reference pattern P provided on the label sides of the first optical disc D and the second optical disc D and recording an image in the image recording layer to the second laser diode 10.

Reference numeral 24 denotes a driving voltage detection circuit detecting a direct-current voltage in the driving signal supplied from the tracking coil driving circuit 21 to the tracking coil 14 and is connected such that the detected direct-current voltage is outputted to the servo circuit 18 and the control circuit 17.

In the above configuration, a ROM (read only memory) in which a program for controlling each operation of the optical disc device is stored is incorporated in the control circuit 17, which is configured such that the various control operations are carried out based on the program read out from the ROM. The control circuit 17 also incorporates an interface circuit receiving a signal outputted from a personal computer provided outside and outputting a signal to the computer.

Also, in the control circuit 17, there are provided an encoder for conversion processing of information data outputted from the personal computer to a recording signal, an image signal processing circuit for conversion processing of image data to an image signal for recording, and an image recording position control circuit for a position control operation for moving a spot of the second laser beam irradiated from the second laser diode 10 to a position for recording the image.

The optical disc device according to an embodiment of the present invention is configured as mentioned above, and its operations will be described below.

First, an operation when a signal is recorded in the signal recording layer provided on the first optical disc D will be described. When the above operation is to be started, the first optical disc D is mounted on the turntable such that the signal side to which the laser beam is irradiated is opposed to the first objective lens L1. In this state, a driving signal is supplied from the first laser diode driving circuit 22 to the first laser diode 9 by the control operation by the control circuit 17.

Upon such an operation, the first laser beam radiated from the first laser diode 9 is irradiated to the signal recording layer provided on the first optical disc D by the focusing operation by the first objective lens L1. Since a signal track is formed in the signal recording layer of the first optical disc D, based on the signal obtained from the first photodetector 11, not only the focus error signal from the first signal calculation circuit 15 but also the tracking error signal is generated. Therefore, the control operation for the focus coil driving circuit 20 and the tracking coil driving circuit 21 is carried out by the servo circuit 18, and a driving signal is supplied from the focus coil driving circuit 20 and the tracking coil driving circuit 21 to the focus coil 13 and the tracking coil 14.

As the result of the above operation, the focus control operation for focusing the first laser beam to the signal recording layer of the first optical disc D as a spot and the tracking control operation to have the spot follow the signal track can be carried out. Also, when the tracking control operation is executed to have the spot follow the signal track of the first optical disc D, the first objective lens L1 is biased to the outer circumference side of the first optical disc D with respect to the main body 1 of the optical pickup device.

A bias amount of the first objective lens L1 to the main body 1 can be detected by detecting a direct-current voltage value of the driving signal supplied from the tracking coil driving circuit 21 to the tracking coil 14. The above detecting operation of the direct-current voltage is carried out by the driving voltage detection circuit 24 all the time, and the detected voltage value is outputted to the servo circuit 18.

When the direct-current voltage value detected by the driving voltage detection circuit 24 reaches a predetermined value, it is determined that the first objective lens L1 reaches a position at which it can not be biased any more, and a driving signal is supplied from the thread motor driving circuit 19 to the thread motor 3. When such a driving signal is supplied to the thread motor 3, the optical pickup feeding shaft 2 is rotated by the rotating operation of the thread motor 3, and an operation to move the main body 1 of the optical pickup device to the outer circumference side of the first optical disc D is carried out. Upon such an operation, the position of the first objective lens L1 with respect to the main body 1 is returned to the opposite direction, by which a displacement operation of the first objective lens L1 by the tracking coil 14 in the outer circumferential direction is enabled.

As the recording operation position in the signal recording layer of the first optical disc D is moved in the outer circumferential direction, the above-mentioned displacement operation of the first objective lens L1 and the driving operation of by the thread motor 3 with respect to the main body 1 are executed.

When the operation to record the signal in the signal recording layer is to be carried out, the first optical disc D is rotated and driven by a spindle motor, and as such a rotating and driving operation, there are a method of driving the first optical disc D with a constant linear speed and a method of driving it with a constant angular speed. The rotating and driving method with the constant linear speed is carried out using a synchronous signal obtained from a groove called as a pregroove formed on the signal track of the first optical disc D.

During the above-mentioned control operation for the optical pickup device, an information data signal, which is a recording signal outputted from the personal computer is inputted to the control circuit 17 via the interface circuit. The information data signal inputted to the control circuit 17 is encoded and processed by various processing circuits provided in the control circuit 17 such as an encoder circuit and given a modulation operation for the recording operation and supplied to the first laser diode driving circuit 22 as a recording signal.

When such a recording signal is inputted to the first laser diode driving circuit 22, a laser driving signal corresponding to the signal is supplied to the first laser diode 9. Such a laser driving signal is supplied to the first laser diode 9, and the laser diode 9 radiates a laser beam corresponding to the driving signal. The laser beam radiated from the first laser diode 9 as above is focused on the signal track of the signal recording layer as a spot by the above-mentioned focus control operation and the tracking control operation, and the information data signal can be recorded in the signal recording layer of the first optical disc D.

The operation for recording the signal in the signal recording layer is carried out as mentioned above, and the reproducing operation of the signal recorded in the signal recording layer can be also executed similarly. In this case, the signal recorded in the signal recording layer is generated as an RF signal by the RF signal generation circuit incorporated in the first signal calculation circuit 15 and then, inputted to the control circuit 17. When the RF signal is inputted to the control circuit 17 as above, a decoding processing operation is carried out by a decoder circuit incorporated in the control circuit 17. The signal demodulated by such a decoding operation and reproduced from the first optical disc D is outputted to the personal computer via the interface circuit.

The recording operation of the signal to the signal recording layer provided on the first optical disc D and the reproducing operation of the signal recorded in the signal recording layer are accomplished as mentioned above, and the recording operation of the signal to the signal recording layer provided on the second optical disc D and the reproducing operation of the signal recorded in the signal recording layer will be described next.

In the recording/reproducing operation using the second optical disc D, the driving operation of the second laser diode 10 is carried out by the driving signal supplied from the second laser diode driving circuit 23 and the focusing operation by the second objective lens L2 of the second laser beam radiated from the second laser diode 10 to the signal recording layer are carried out. Upon the focusing operation of the second laser beam, a signal generation operation is carried out by the second signal calculation circuit 16 based on the signal obtained from the second photodetector 12, and similarly to the above-mentioned case when the first optical disc D is used, the supplying operation of the driving signal from the focus coil driving circuit 20 to the focus coil 13 and the supplying operation of the driving signal from the tracking coil driving circuit 21 to the tracking coil 14 are carried out.

As the result of the above operations, the focusing operation of the second laser beam to the signal recording layer, that is, the focus control operation and the operation to have the spot follow the signal track, that is, the tracking control operation are carried out. In this case, too, the detecting operation of the direct-current voltage by the driving voltage detection circuit 24, the control operation for the thread motor 3, and the rotation control operation for the second optical disc D by the spindle motor are carried out.

Moreover, during the above control operations, the encoding processing operation for the recording signal and the decoding processing for the reproduced signal by the control circuit 17 are carried out, and the recording/reproducing operation using the second optical disc D is executed.

As mentioned above, the normal operations using the signal recording layers provided on the first optical disc D and the second optical disc D are carried out, and the recording operation of image data in the image recording layer, which is a gist of an embodiment of the present invention, will be described below. Since the signal track is not provided in the image recording layer, not only the tracking control operation can not be executed, but also the spot position of the laser beam can not be recognized from the optical disc D, either. Moreover, since an irradiated light amount of the return light reflected from the image recording layer of the optical disc D to the second photodetector 12 is small, the focus control operation can not be executed. Therefore, the focus control operation when the image data is to be recorded in the image recording layer is carried out by using the art described in the above Japanese Patent Laid-Open No. 2005-216468. The description on the operation of that part will be omitted.

Also, since the signal track is not provided in the image recording layer provided on the optical disc D, a synchronization signal is not recorded. Thus, when the image recording operation is to be carried out, since the optical disc D can not be rotated and driven at a constant linear speed, the optical disc D is rotated and driven by a spindle motor at a constant angular speed.

when the operation to record the image data in the image recording layer of the optical disc D is to be carried out, the optical disc D is mounted on the turntable such that the label side, which is a side opposite the signal side to which the laser beam is irradiated is opposed to the first objective lens L1 or the second objective lens L2.

The image data to be recorded in the image recording layer is inputted to the control circuit 17 via the interface circuit from the personal computer, and a position information signal indicating a recording position on the optical disc D is included in the image data in addition to the image signal.

The image signal is processed by an image signal processing circuit provided in the control circuit 17 and then, outputted to the laser diode control circuit 22. The position information signal is inputted to an image recording position control circuit provided in the control circuit 17 and used for a control operation for specifying a spot position of the laser beam by the image recording position control circuit.

Based on the position control signal outputted from the image recording position control circuit, a driving signal is supplied from the servo circuit 18 to the tracking coil driving circuit 21 and the thread motor driving circuit 19. In order to move the spot of the laser beam to a desired position on the optical disc D, first, the thread motor 3 is rotated and driven by a driving signal outputted from the thread motor driving circuit 19 so as to move the main body 1 of the optical pickup device to the desired position.

The operation to move the main body 1 of the optical pickup device to the desired position by rotating and driving the thread motor 3 can be carried out by providing means for generating a pulse signal according to the rotating operation of the thread motor 3, for example, such that the rotation number of the thread motor 3 is recognized from the number of pulses and the moved position of the main body 1 is set from the relation between the rotation number and the moving distance of the main body 1 by rotation of the optical pickup feeding shaft 2.

The displacement operation of the optical pickup device main body 1 to the image data recording position is carried out by the above rotation-amount control operation of the thread motor 3, and an operation to control a position of the second objective lens L2 is carried out when the main body 1 has been displaced to such a position. The displacement control operation of the second objective lens L2 in the radial direction is carried out by supplying a driving signal from the tracking coil driving circuit 21 to the tracking coil 14.

By supplying the driving signal from the tracking coil driving circuit 21 to the tracking coil 14, the second objective lens L2 is displaced in the radial direction of the optical disc D, and the control operation by the driving signal for the displacement operation is carried out based on the relation between the level of the driving signal supplied to the tracking coil 14 and the displacement amount of the second objective lens L2, that is, a driving sensitivity. A sensitivity detection operation of the tracking coil 14 is carried out by using the reference pattern P provided on the label side of the optical disc D. However, the art is described in the above Japanese Patent Laid-Open No. 2005-93052, and the description will be omitted.

The position of the spot in the radial direction is controlled by the displacement amount control operation of the second objective lens L2 by the tracking coil 14 and the moving amount control operation in the radial direction of the main body 1 by rotation of the thread motor 3, and the angular position control operation, which is a position of the optical disc D in the rotating direction can be executed by providing means for generating a pulse signal with rotation of the spindle motor and by counting the number of pulses generated by the means.

That is, by counting the number of pulses generated from the pulse generating means according to the rotation of the spindle motor, the rotating angle of the optical disc D is recognized and when the spot is moved to a position on the optical disc D determined by the angle and the above-mentioned spot position in the radial direction, the level of the driving signal supplied from the second laser diode driving circuit 23 to the second laser diode 10 is raised to a level capable of the recording operation so that the image data can be recorded in the image recording layer.

As mentioned above, when the level of the driving signal supplied form the second laser diode driving circuit 23 to the second laser diode 10 is raised to a level capable of the recording operation, a spot irradiated portion in the image recording layer is discolored and the image data is formed as visible information. Therefore, by recording the image data in the image recording layer of the optical disc D through the above-mentioned operation, a visible image can be formed on the label side.

As mentioned above, the second laser beam radiated from the second laser diode 10 is focused by the second objective lens L2 to the image recording layer and the image data is recorded in the image recording layer by the spot generated by the focusing operation. The image recoding operation by the second laser beam is carried out not only for the second optical disc but also for the first optical disc.

That is, an embodiment of the present invention is configured such that by use of the second laser beam irradiated from the second objective lens L2 provided on the outer circumference side both in the first optical disc and the second optical disc, the image data is recorded in the image recording layer provided on each of the optical discs D.

And an embodiment of the present invention is configured such that a sensitivity adjusting operation of the tracking coil carried out for the accurate image data recording operation, that is, the sensitivity adjusting operation using the reference pattern P is executed by the first laser beam radiated from the first objective lens L1 provided on the inner circumference side both in the first optical disc and the second optical disc. Such a sensitivity adjusting operation is carried out by irradiating the first laser beam radiated from the first objective lens L1 to the reference pattern P provided on the first optical disc and the second optical disc, but the art described in the above Japanese Patent Laid-Open No. 2005-93052 can be used for the sensitivity adjusting operation, and the description will be omitted.

The reason why the sensitivity adjusting operation can be accomplished by the first laser beam radiated from the first objective lens L1 provided on the inner circumference side is that both the first objective lens L1 and the second objective lens L2 are fixed to be arranged onto the same lens holder 4. That is, since both the first objective lens L1 and the second objective lens L2 are fixed to be arranged onto the same lens holder 4, the tracking coil 14 for displacing the both objective lenses in the radial direction is commonly used, and the sensitivity adjusting operation can be carried out for both the optical discs.

With the above configuration, that is, with the configuration that the reading operation of the reference pattern P provided on the first optical disc and the second optical disc by the first laser beam radiated from the first objective lens L1 arranged on the inner circumference side is carried out and the recording operation of the image signal in the image recording layer provided on the first optical disc and the second optical disc by the second laser beam radiated from the second objective lens L2 arranged on the outer circumference side is carried out, if the distance between the first objective lens L1 and the second objective lens L2 is not accurate, the recording position of the image signal might be displaced from a target position.

An embodiment of the present invention provides an art capable of accurately measuring the above-mentioned distance between the first objective lens L1 and the second objective lens L2, which will be described below.

In FIG. 2A illustrating an example relating to a reference position K of the second objective lens L2 arranged on the outer circumference side, the reference position K is set at the boundary between the reflection area D3 in which the reference pattern P is formed and the image recording area D4. In the recognition operation of the reference position K, the second objective lens L2 is displaced in the radial direction of the optical disc D, and the recognition can be easily made from a change in the reflected light amount. And the detection movement operation to the reference position K of the second objective lens L2 is carried out while the driving signal is supplied from the second laser diode driving circuit 23 to the second laser diode 10, the level of the driving signal being set at a level not adversely affecting the image recording layer.

When the moving operation of the second objective lens L2 to the reference position K is carried out, then, the operation to move the first objective lens L1 to the reference position K is started. That is, such an operation is executed by supplying the driving signal from the first laser diode driving circuit 22 to the first laser diode 9 and by switching to a state where the control operation for the first objective lens L1 is carried out.

FIG. 2B illustrates that the first objective lens L2 has been moved to the reference position K. The displacement operation from the position shown in FIG. 2A to the position shown in FIG. 2B is executed by the moving operation of the main body 1 of the optical pickup device and the displacement operation of the lens holder 4, and it is obvious that the moving distance of the lens holder 4 is a distance between the first objective lens L1 and the second objective lens L2.

Since the above-mentioned moving operation of the lens holder 4 is carried out by the moving operation of the main body 1 by the rotation of the thread motor 3 and the displacement of the lens holder 4 by the tracking coil 14, by measuring the moving distance of the main body 1 by the rotation of the thread motor 3 and the displacement amount of the lens holder 4 by the tracking coil 14, the moving distance of the lens holder 4 can be obtained.

The moving distance of the main body 1 by the rotation of the thread motor 3 is recognized by counting the number of pulses outputted from the thread motor driving circuit 19. That is, the moving distance of the main body 1 can be obtained from the number of pulses obtained from the relation between the rotation number of the optical pickup feeding shaft 2 due to the rotation of the thread motor 3 and the moving distance of the main body 1.

On the other hand, the displacement amount of the lens holder 4 can be recognized by the direct-current voltage included in the driving signal supplied from the tracking coil driving circuit 21 to the tracking coil 14. That is, the direct-current voltage value included in the driving signal supplied from the tracking coil driving circuit 21 is detected by the driving voltage detection circuit 24, and since the detected voltage is outputted to the control circuit 17, the displacement amount can be recognized by the control circuit 17.

Since the moving distance of the main body 1 and the displacement distance of the lens holder 4 can be obtained as above, the distance for which the lens holder 4 is moved by the displacement operation from the position shown in FIG. 2A to the position shown in FIG. 2B, that is, the distance between the first objective lens L1 and the second objective lens L2 can be measured.

As mentioned above, the operation when the reference position K is set at the boundary between the reflection area D3 in which the reference pattern P is formed and the image recording area D4 is carried out, but the reference position can be set using the reference pattern P used for the sensitivity adjustment of the tracking coil 14. Next, the setting operation of the reference position K will be described by referring to FIGS. 4A and 4B.

FIGS. 4A and 4B show a relation between the reflection signal and the reference pattern P while the positional relation between the spot of the laser beam and the reference pattern P is different, and as shown in FIGS. 4A and 4B, the level of the reflection signal obtained from the first signal calculation circuit 15 or the second signal calculation circuit 16 is changed according to the movement of the spot. The level of the signal reflected by a reflection portion constituting the reference pattern P is raised, while the level of the signal reflected by a non-reflection portion is lowered.

As shown in the figure, it is known that a ratio between a reflection period T1 in which a reflection signal is obtained and a cycle T2 is changed, on the basis of the positional relation between the spot position and the reference pattern P. Since the period ratio of the reflection period T1 to the cycle T2, that is, a duty ratio is changed according to the movement of the spot position of the laser beam in the radial direction of the optical disc D, the position of the spot on the optical disc D in the radial direction can be determined by setting the duty ratio. That is, since it is possible to set as the reference position K the position of the reference pattern P determined by the duty ratio as above, the distance between the first objective lens L1 and the second objective lens L2 can be measured using the reference position K.

In this embodiment, the distance between the first objective lens L1 and the second objective lens L2 is measured by using the optical disc D sold in the market in general, but an optical disc to be a reference may be produced such that the distance between the first objective lens L1 and the second objective lens L2 can be measured using the optical disc at manufacture of the optical disc device. In this case, the measured distance data between the first objective lens L1 and the second objective lens L2 is stored in a ROM or the like provided in the control circuit 17, and the calculation processing operation is carried out for sensitivity adjustment using this stored data.

Also, in this embodiment, the moving distance of the lens holder 4 is obtained by moving the first objective lens L1 to the reference position K after moving the second objective lens L2 to the reference position K, but to the contrary, the moving distance of the lens holder 4 may be obtained by moving the second objective lens L2 to the reference position K after moving the first objective lens L1 to the reference position K.

As mentioned above, the optical disc device according to this embodiment configured such that the signal recording operation in the signal recording layer and the image recording operation in the image recording layer of the optical disc using the optical pickup device, incorporating the first objective lens for focusing the laser beam radiated from the first laser diode to the signal recording layer and the image recording layer provided on the optical disc and fixed onto the lens holder supported by the support wires, capable of displacement in the signal side direction of the optical disc and in the radial direction of the optical disc and the second objective lens for focusing the laser beam radiated from the second laser diode to the signal recording layer and the image recording layer provided on the optical disc and fixed to be arranged side by side with the first objective lens in the radial direction of the optical disc on the lens holder, when the first objective lens is made as a lens arranged on the inner circumference side, the data for image recording control provided on the inner circumference side of the optical disc is read out by the first laser beam radiated from the first objective lens and the image signal is recorded in the image recording layer provided on the optical disc by the second laser beam radiated from the second objective lens, and the recording position of the image signal is calibrated by measuring the radial distance (the distance in the radial direction) between the first objective lens and the second objective lens. Thus, the spot position of the laser beam radiated for the image recording operation can be controlled at an accurate position, and as a result, an accurate image signal can be recorded in the image recording layer.

Also, since the optical disc device according to this embodiment is configured to measure the radial distance between the first objective lens and the second objective lens from the distance for which the lens holder is moved from the position where the first laser beam is irradiated to the reference position on the optical disc till the second laser beam is irradiated to the reference position, that is, the distance measurement between the both lenses is finished when the second laser beam used for the image recording operation is moved to the reference position, and the moving operation of the second objective lens to the image recording area, which is the subsequent operation, can be executed efficiently.

And since the optical disc device according to this embodiment obtains the moving distance of the lens holder based on the moving distance of the optical pickup device main body and the displacement amount of the objective lens to the optical pickup device main body, the radial distance between the first objective lens and the second objective lens can be obtained accurately.

Also, in the optical disc device according to this embodiment, since the reference position on the optical disc is set based on the data for image recording control, the reference position can be specified even if there is any fluctuation in the arrangement position of the data for image recording control provided on the optical disc, and thus, the radial distance between the first objective lens and the second objective lens can be obtained accurately.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical disc device comprising: a first laser diode configured to radiate a first laser beam with a first wavelength; a second laser diode configured to radiate a second laser beam with a second wavelength different from the first wavelength; a first objective lens configured to irradiate the first laser beam to a reflection area so as to read out image recording control data for controlling record of an image recorded in the reflection area provided on a label side of an optical disc; a second objective lens configured to irradiate the second laser beam to an image recording area so as to record an image in the image recording area provided on the label side after reading out the image recording control data; a lens holder configured such that the first objective lens and the second objective lens are fixed thereon to be arranged side by side in a radial direction of the optical disc, the lens holder configured to be displaced in a direction toward a signal side of the optical disc and in a radial direction of the optical disc; and a control unit configured to obtain a distance between the first objective lens and the second objective lens in the radial direction so as to calibrate a recording position of an image signal recorded in the image recording area, wherein the control unit obtains the distance between the first objective lens and the second objective lens in the radial direction, from a distance for which the lens holder is moved in the radial direction from a position where the first laser beam is irradiated to a reference position on the label side to a position where the second laser beam is irradiated to the reference position.

2. The optical disc device according to claim 1, wherein an optical pickup device includes the first laser diode, the second laser diode, the first objective lens, the second objective lens, and the lens holder, and wherein
the control unit obtains a moving distance of the lens holder in the radial direction, based on a moving distance of the optical pickup device in the radial direction and on a displacement amount of the second objective lens with respect to the optical pickup device.

3. The optical disc device according to claim 2, wherein the control unit obtains a moving distance of the optical pickup device in the radial direction, based on a rotation number of a thread motor displacing the optical pickup device in the radial direction.

4. The optical disc device according to claim 2, wherein the control unit obtains the displacement amount of the second objective lens with respect to the optical pickup device, based on a direct-current voltage value of a driving signal supplied to a tracking coil for displacing the second objective lens in the radial direction.

5. The optical disc device according to claim 1, wherein the control unit sets the reference position based on the image recording control data.

6. The optical disc device according to claim 5, wherein the image recording control data is a pattern in which a first face and a second face with different reflectance are arranged alternately.

7. The optical disc device according to claim 6, wherein the first face is in a serrated shape, and the second face is in a shape made by the first face adjacent thereto.

8. The optical disc device according to claim 7, wherein the reference position is set, based on a proportion of a spot of the second laser beam irradiated to the first face per cycle.

9. An optical disc device comprising: a first laser diode configured to radiate a first laser beam with a first wavelength; a second laser diode configured to radiate a second laser beam with a second wavelength different from the first wavelength; a first objective lens configured to irradiate the first laser beam to a reflection area so as to read out image recording control data for controlling record of an image recorded in the reflection area provided on a label side of an optical disc; a second objective lens configured to irradiate the second laser beam to an image recording area so as to record an image in the image recording area provided on the label side after reading out the image recording control data; a lens holder configured such that the first objective lens and the second objective lens are fixed thereon to be arranged side by side in a radial direction of the optical disc, the lens holder configured to be displaced in a direction toward a signal side of the optical disc and in a radial direction of the optical disc; and a control unit configured to obtain a distance between the first objective lens and the second objective lens in the radial direction so as to calibrate a recording position of an image signal recorded in the image recording area, wherein the control unit obtains the distance between the first objective lens and the second objective lens in the radial direction, from a distance for which the lens holder is moved in the radial direction from a position where the second laser beam is irradiated to a reference position on the label side to a position where the first laser beam is irradiated to the reference position.

10. The optical disc device according to claim 9, wherein an optical pickup device includes the first laser diode, the second laser diode, the first objective lens, the second objective lens, and the lens holder, and wherein
the control unit obtains a moving distance of the lens holder in the radial direction, based on a moving distance of the optical pickup device in the radial direction and on a displacement amount of the second objective lens with respect to the optical pickup device.

11. The optical disc device according to claim 10, wherein the control unit obtains a moving distance of the optical pickup device in the radial direction, based on a rotation number of a thread motor displacing the optical pickup device in the radial direction.

12. The optical disc device according to claim 10, wherein the control unit obtains the displacement amount of the second objective lens with respect to the optical pickup device, based on a direct-current voltage value of a driving signal supplied to a tracking coil for displacing the second objective lens in the radial direction.

13. The optical disc device according to claim 9, wherein the control unit sets the reference position based on the image recording control data.

14. The optical disc device according to claim 13, wherein the image recording control data is a pattern in which a first face and a second face with different reflectance are arranged alternately.

15. The optical disc device according to claim 14, wherein the first face is in a serrated shape, and the second face is in a shape made by the first face adjacent thereto.

16. The optical disc device according to claim 15, wherein the reference position is set, based on a proportion of a spot of the second laser beam irradiated to the first face per cycle.

* * * * *